United States Patent [19]

Denhez et al.

[11] Patent Number: 4,694,291

[45] Date of Patent: Sep. 15, 1987

[54] DEVICE FOR TRANSMITTING A CLOCK SIGNAL ACCOMPANIED BY A SYNCHRONIZATION SIGNAL

[75] Inventors: Alain Denhez, Velizy-Villacoublay; Francis Hargoaa, Paris; Jean Aubrée, Bougival, all of France

[73] Assignee: Alcatel, Paris, France

[21] Appl. No.: 826,648

[22] Filed: Feb. 6, 1986

[30] Foreign Application Priority Data

Feb. 7, 1985 [FR] France ................................ 85 01723

[51] Int. Cl.[4] .............................................. H04Q 1/00
[52] U.S. Cl. ............................. 340/825.2; 340/825.14; 370/100; 375/106
[58] Field of Search ........................ 340/825.14, 825.2; 370/91, 100, 108, 101; 375/106, 107

[56] References Cited

U.S. PATENT DOCUMENTS 4,164,629  8/1979  Ollivier et al. .
4,276,645  6/1981  Lager et al. .
4,573,173  2/1986  Yoshida ............................... 370/108

FOREIGN PATENT DOCUMENTS 505604   6/1976  Australia .
1527160  10/1978  United Kingdom .

Primary Examiner—Ulysses Weldon
Attorney, Agent, or Firm—Sughrue, Mion, Zinn, Macpeak, and Seas

[57] ABSTRACT

A transmission device comprises a transmitter and at least one receiver delivering a clock signal and a synchronization signal to circuits connected on the output side of the receiver. Each receiver is connected to the transmitter either directly or through a group of repeaters. The transmitter comprises a clock, a synchronization circuit connected to a selector circuit and a flip-flop the output of which is looped back to an input through the intermediary of a delay circuit and the selector circuit. The flip-flop has an output connected to an inverter which delivers a clock signal accompanied by a synchronization signal. A repeater comprises a test circuit, a synchronization circuit, a flip-flop, a delay circuit and a selector circuit. A receiver comprises a test circuit, a restore circuit, a detector circuit and a synchronization and divider circuit.

6 Claims, 8 Drawing Figures

DEVICE FOR TRANSMITTING A CLOCK SIGNAL ACCOMPANIED BY A SYNCHRONIZATION SIGNAL

BACKGROUND OF THE INVENTION

1. Field of the invention

The invention concerns the transmission of a clock signal accompanied by a synchronization signal in a transmission device comprising a transmitter delivering over the same link the clock signal and the synchronization signal, one or more repeaters in the link, and a receiver for delivering separately the clock signal and the synchronization signal to circuits which use them.

2. Description of the prior art

Such transmission devices are routinely used for controlling electronic devices from a single clock, and the synchronization signal generally corresponds to the elimination of one pulse of the clock signal which is achieved on transmission by the momentary modification of the clock signal frequency, requiring the clock signal to be reconstituted at the receiving end.

An object of the present invention is to provide for the transmission of a clock signal comprising a synchronization signal obtained without modifying the clock signal frequency.

SUMMARY OF THE INVENTION

The present invention consists in a device for transmitting a clock signal accompanied by a synchronization signal, comprising a transmitter, a receiver adapted to deliver a clock signal and a synchronization signal to circuits connected to its output, a link between said transmitter and said receiver and at least one repeater in said link, wherein said transmitter comprises a clock, a synchronization circuit, a flip-flop, a selector circuit, a delay circuit and an output inverter, said synchronization circuit has an input connected to said clock and first and second outputs connected to said selector circuit, said selector circuit has an input connected to a direct output of said flip-flop by said delay circuit and an output connected to a reset input of said flip-flop, and said flip-flop has a clock input connected to said clock, a data input adapted to be connected to a positive potential and a direct output connected to said output inverter which delivers a clock and synchronization signal to the output of said transmitter.

Other characteristics and advantages of the invention will emerge from the following description of one embodiment given with reference to the accompanying drawings.

DESCRIPTION OF THE PREFERRED EMBODIMENT

Figure 1:
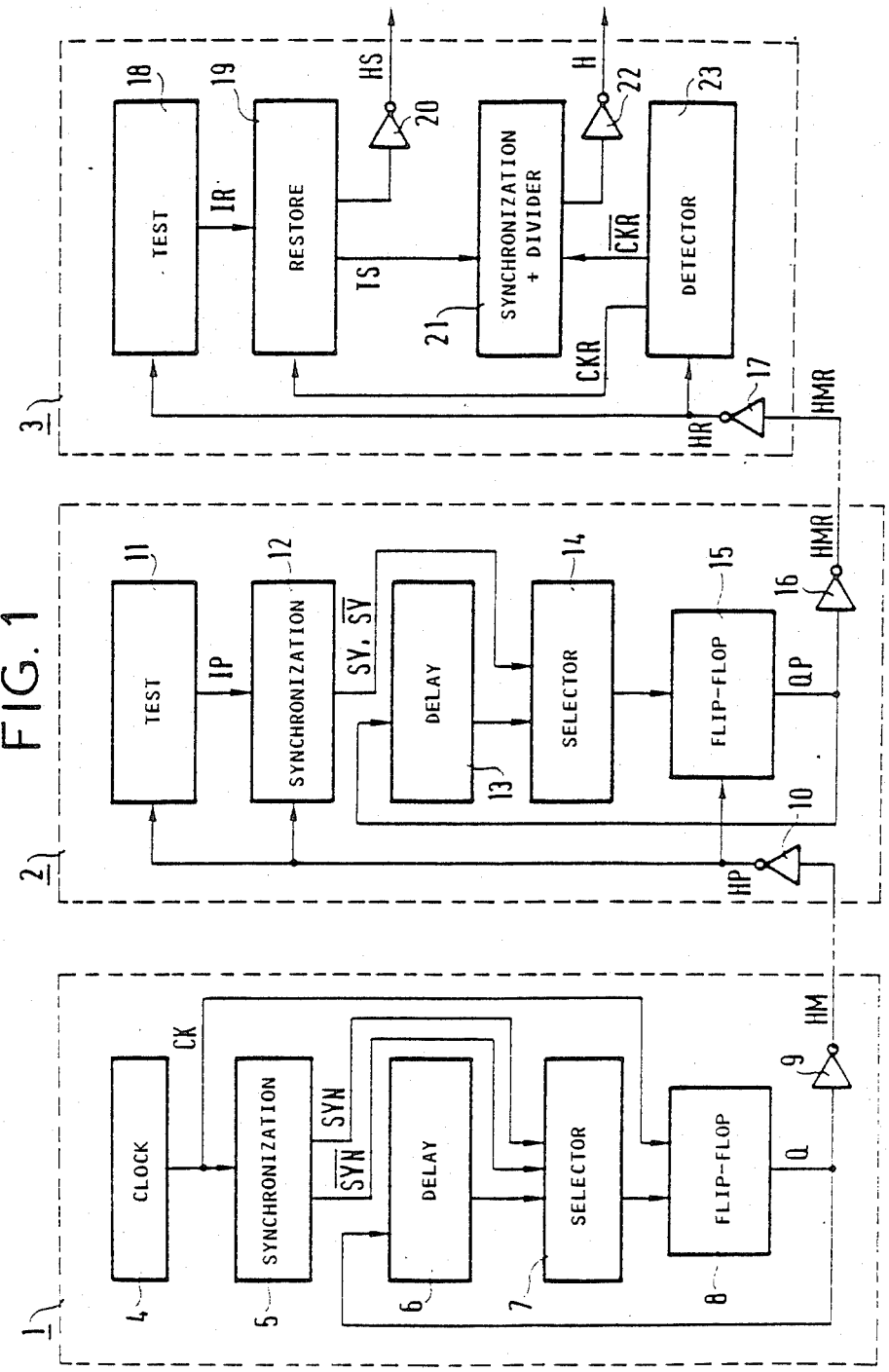
FIG. 1 shows a transmission device in accordance with the invention.

The transmission device in accordance with the invention shown in FIG. 1 comprises a transmitter 1, a repeater 2 and receiver 3.

In the transmitter 1, a clock 4 delivers clock pulses CK to a synchronization circuit 5 and to a flip-flop 8; the output of the flip-flop 8 is connected to a delay circuit 6 and to an inverter 9 to which it delivers a signal Q, the inverter 9 delivering the clock and synchronization signal HM at the output of the transmitter; the output of the delay circuit 6 is connected to a selector circuit 7 which has another input connected to the synchronization circuit 5 from which it receives synchronization pulses SYN and $\overline{SYN}$; the output of the selector circuit is connected to the flip-flop 8.

In the repeater 2, the input of an inverter 10 is connected to the transmitter 1 from which it receives the clock and synchronization signal HM and the output of the inverter 10 is connected to a test circuit 11, a synchronization circuit 12 and a flip-flop 15, to which it delivers a signal HP; the output of the test circuit 11 is connected to the synchronization circuit to which it delivers a pulse IP and the output of the flip-flop 15 is connected to a delay circuit 13 and to an inverter 16 to which it delivers a signal QP, the inverter 16 delivering a clock and synchronization signal HMR at the output of the repeater; the output of the delay circuit 13 is connected to a selector circuit 14 which has another input connected to the synchronization circuit 12 from which it receives synchronization pulses SY and $\overline{SY}$; the output of the selector circuit is connected to the flip-flop 15.

In the receiver 3, an input of an inverter 17 is connected to the output of the repeater 2, from which it receives the clock and synchronization signal HMR, and the output of the inverter 17 is connected to a test circuit 18 and to a circuit 23 for detecting pulses of the clock signal, to which it delivers a signal HR; the output of the test circuit is connected to a circuit 19 for restoring the synchronization signal to which it delivers a pulse IR and the detector circuit 23 has a first output connected to deliver a signal CKR to the restore circuit 19 and a second output connected to deliver a signal $\overline{CKR}$ to a synchronization and divider circuit 21; the restore circuit 19 has a first output connected to an inverter 20 which delivers an output synchronization signal HS and a second output connected to deliver a synchronization pulse TS to the synchronization and divider circuit 21, the output of which is connected to an inverter 22 delivering a clock signal H at the output of the receiver 3.

Figure 2:
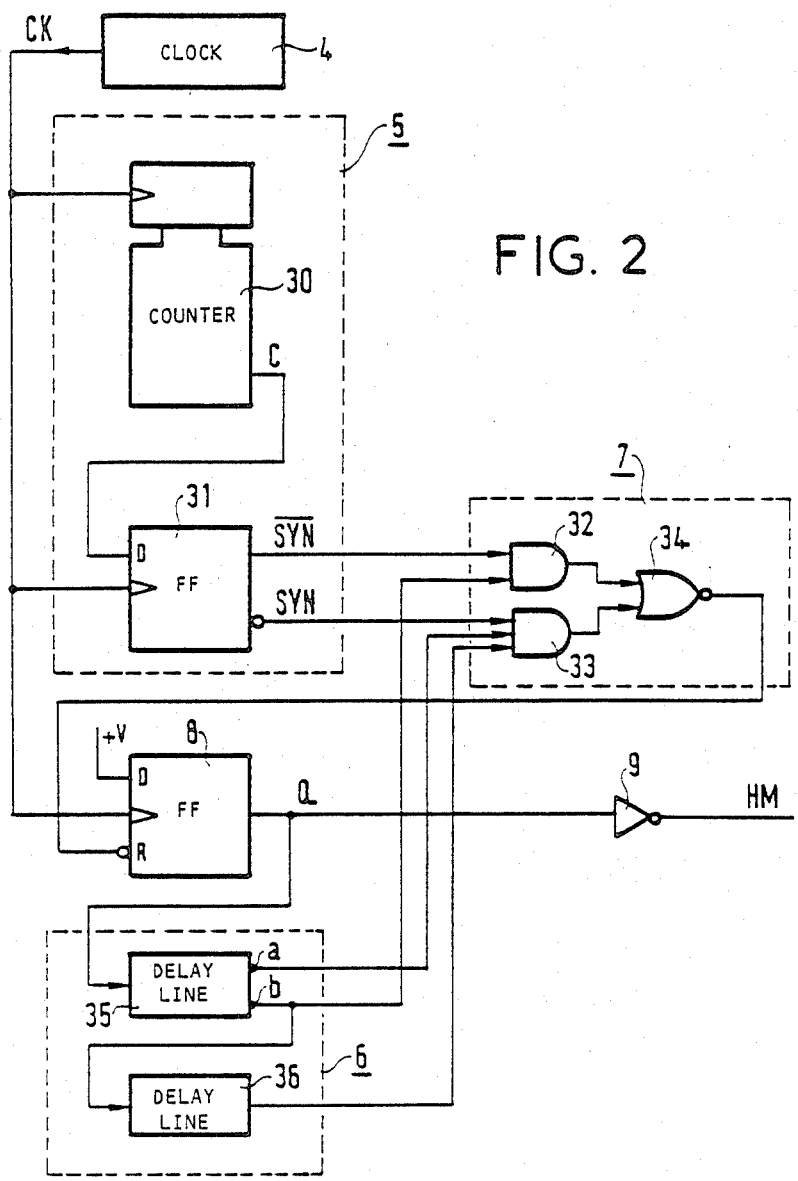
FIG. 2 shows a transmitter of the transmission device of FIG. 1.

FIG. 2 shows the transmitter 1 from FIG. 1. The synchronization circuit comprises a counter 30 and a type D flip-flop 31; the count input of the counter is connected to the output of the clock 4 from which it receives the clock pulses CK and its ripple carry output is connected to the data input of the flip-flop 31 and delivers to it a signal C when the counter has reached its counting capacity. The flip-flop 31 has a clock input connected to the output of the clock 4, a direct output and a complemented output connected to the selector circuit 7 to which these outputs deliver synchronization pulses SYN and $\overline{SYN}$, respectively. The type D flip-flop 8 has a data input connected to a positive potential +V, a clock input connected to the output of the clock 4, a reset input connected to the output of the selector circuit 7 and a direct output connected to the inverter 9; the flip-flop 8 delivers a clock and synchronization signal Q to the inverter which delivers the clock and synchronization signal HM at the output of the transmitter 1. The delay circuit 6 comprises a first delay line 35 and a second delay line 36; the first delay line 35 has an input connected to the direct output of the flip-flop 8 and a first output a and a second output b connected to the selector circuit 7; the second delay line 36 has an input connected to the second output b of the first delay line 35 and an output connected to the selector circuit 7. The selector circuit 7 comprises first and second AND gates 32 and 33 and a NOR gate 34; the first AND gate 32 has one input connected to the direct output of the flip-flop 31 and another input connected to the second output b of the first delay line 35; the second AND gate 33 has a first input connected to the complemented output of the flip-flop 31, a second input connected to the first output a of the first delay line 35 and a third input connected to the output of the second delay line 36; the NOR gate 34 has one input connected to the output of the first AND gate 32, another input connected to the output of the second AND gate 33 and an output connected to the reset input of the flip-flop 8.

Figure 6:
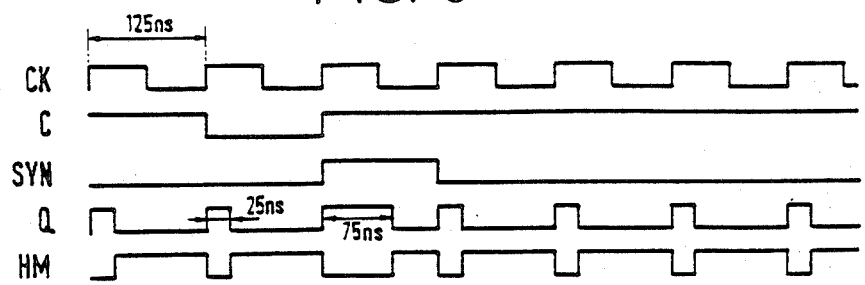
FIGS. 6 through 8 are timing diagrams for signals in the transmitter, the receiver and the repeater of FIG. 1.

By way of example it will be assumed that the clock 4 delivers clock pulses CK at a frequency of 8 MHz and thus with a period of 125 nanoseconds, that the first delay line 35 introduces a time-delay of 10 ns on its first output a and a time-delay of 25 ns on its second output b, and that the second delay line introduces a time-delay of 50 ns. FIG. 6 is a timing diagram for the transmitter signals; in the absence of any pulse C at the output of the counter 30, the direct output of the flip-flop 31 has the value 1 and its complemented output the value 0 (line SYN in the timing diagram) and the flip-flop 8 is reset to zero 25 ns after the appearance of a pulse in the output signal Q. When the counter reaches its counting capacity it delivers a negative pulse C, the direct output of the flip-flop 31 assumes the value 0, and the complemented output the value 1 (pulse $\overline{SYN}$); the AND gate 32 is inactive and the AND gate 33 is activated 75 ns after the appearance of a pulse in the signal Q at the output of the flip-flop 8, which resets this flip-flop to zero; there is thus obtained a pulse of duration 75 ns in the signal Q at the output of the flip-flop 8, this pulse corresponding to a synchronization pulse, and the AND gate 33 is deactivated by the first output a of the first delay line 35, this ocurring 10 ns after the flip-flop 8 is reset to zero; thus the signal delivered by the selector circuit 7 takes its initial value again when there has elapsed, beginning from the rising edge of the pulse of signal CK for recognition of pulse E from the counter 30, a time interval equal to 85 ns increased by twice the propagation time tp of the flip-flop 8 and twice the propagation time t'p of the selector circuit, that is to say 85 ns+2 tp+2 t'p, this time interval being less than the duration of one period of the clock pulses CK in order for all the edges of the clock pulses to be recognized. As the signal Q is applied to the inverter 9, the latter delivers at the output of the transmitter the clock and synchronization signal HM in which the clock pulses, of duration 25 ns, correspond to the positive edges of the clock pulses CK and a synchronization pulse of duration 75 ns replaces one clock pulse; the repetition frequency of the synchronization pulses depends on the counting capacity of the counter 30; if the counter has a counting capacity of 1,000, then the time separating two synchronization pulses is 125 microseconds.

Figure 3:
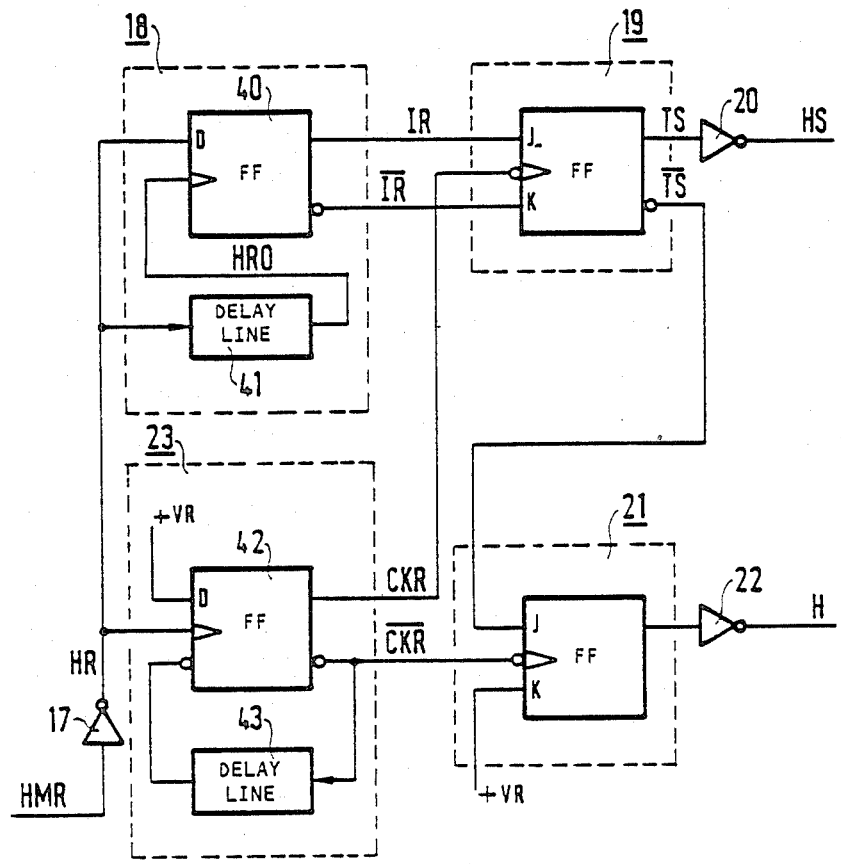
FIG. 3 shows a receiver of the transmission device of FIG. 1.

FIG. 3 shows the receiver 3 from FIG. 1. The test circuit 18 comprises a type D flip-flop 40 and a delay line 41 introducing a time-delay greater than the duration of a clock pulse and less than the duration of a synchronization pulse. The flip-flop 40 has a data input connected to the output of the inverter 17 which delivers the signal HR, a clock output connected to the output of the delay line 41, a direct output delivering a pulse IR and a complemented output delivering a pulse $\overline{IR}$; the delay line 41 has an input connected to the output of the inverter 17 and delivers at its output a signal HRO which corresponds to the signal HR delayed by, for example, 60 ns. The restore circuit 19 which restores and delivers the synchronization signal embodied in the clock and synchronization signal HMR received by the receiver comprises a JK type flip-flop having a first input J connected to the direct output of the flip-flop 40, a second input K connected to the complemented output of the flip-flop 40, a clock input connected to the first output of the detector circuit 23, a direct output connected to the inverter 20 and a complemented output connected to the synchronization and divider circuit 21. The detector circuit 23 comprises a type D flip-flop 42 and a delay line 43; the flip-flop has a data input connected to a positive potential +VR, a clock input connected to the output of the inverter 17, a direct output connected to the clock input of the flip-flop of the restore circuit 19 and a complemented output connected on the one hand to the reset input of the flip-flop 42 through the delay line 43 and on the other hand to the synchronization and divider circuit 21. The synchronization and divider circuit 21 comprises a JK type flip-flop having a first input J connected to the complemented output of the flip-flop of the restore circuit 19, a clock input connected to the complemented output of the flip-flop 42, a second input K connected to a positive potential +VR and an output connected to the inverter 22.

Figure 7:
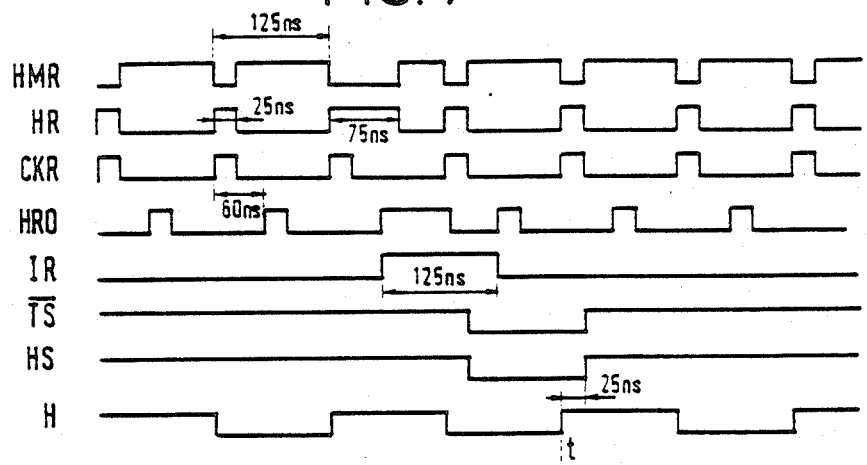

FIG. 7 is a timing diagram for the receiver signals. The signal HMR at the receiver input is either the signal HM delivered by the transmitter when the link between the transmitter and the receiver is sufficiently short and does not require the use of one or more repeaters, or the signal delivered by the last repeater of a group of repeaters in the case where the transmitter-receiver link requires one or more repeaters to be used. The signal HR, which is the complement of the signal HMR, comprises 25 ns clock pulses and 75 ns synchronization pulses; the signal HRO at the output of the delay line 41 is the signal HR delayed by 60 ns. When the flip-flop 40 of the test circuit receives clock pulses of the signal HR, the direct output of the flip-flop has the value 0 and the complemented output the value 1; when the flip-flop receives a synchronization pulse it delivers a pulse IR on its direct output and a pulse $\overline{IR}$ on its complemented output, of duration 125 ns, corresponding to the period of the clock signal; thus the pulses IR and $\overline{IR}$ appear when the synchronization pulse in the signal HR is recognized by the signal HRO. Thus the test circuit 18 tests the duration of the pulses of the signal HR and delivers pulses IR and $\overline{IR}$ when the duration of a pulse of the signal HR is greater than the time-delay of the delay line 41, that is to say when the signal HR comprises a synchronization pulse; the role of the test circuit is thus to detect the synchronization pulses by testing the duration of the pulses of the signal HR and to deliver the pulses IR and $\overline{IR}$ following such detection. The detector circuit 23 delivers on the direct output of the flip-flop 42 the signal CKR consisting of pulses on each positive edge of the signal HR; the duration of the pulses CKR is set by the delay line 43, the time-delay of which is 25 ns; the signal CKR thus consists of pulses with a period of 125 ns and drives the restore circuit 19; when the flip-flop 19 of the restore circuit receives the pulse IR from the flip-flop 40 it delivers a synchronization pulse TS on its direct output and a synchronization pulse $\overline{TS}$ on its complemented output. The inverter 20 which receives the synchronization pulse TS delivers the synchronization signal HS. The flip-flop of the synchronization and divider circuit 21 is driven by the signal $\overline{CKR}$ and delivers a signal which after inversion by the inverter 22 gives the clock signal H at the receiver output, this signal being at half the frequency of the clock signal in the signal HMR at the receiver input; the period of the clock signal H is thus 250 ns. At time t of signal H (FIG. 7) the signal $\overline{CKR}$ recognizes the synchronization pulse TS, which enables the clock signal H to be synchronized so that it features a positive pulse when the receiver delivers the synchronization signal HS.

Figure 4:
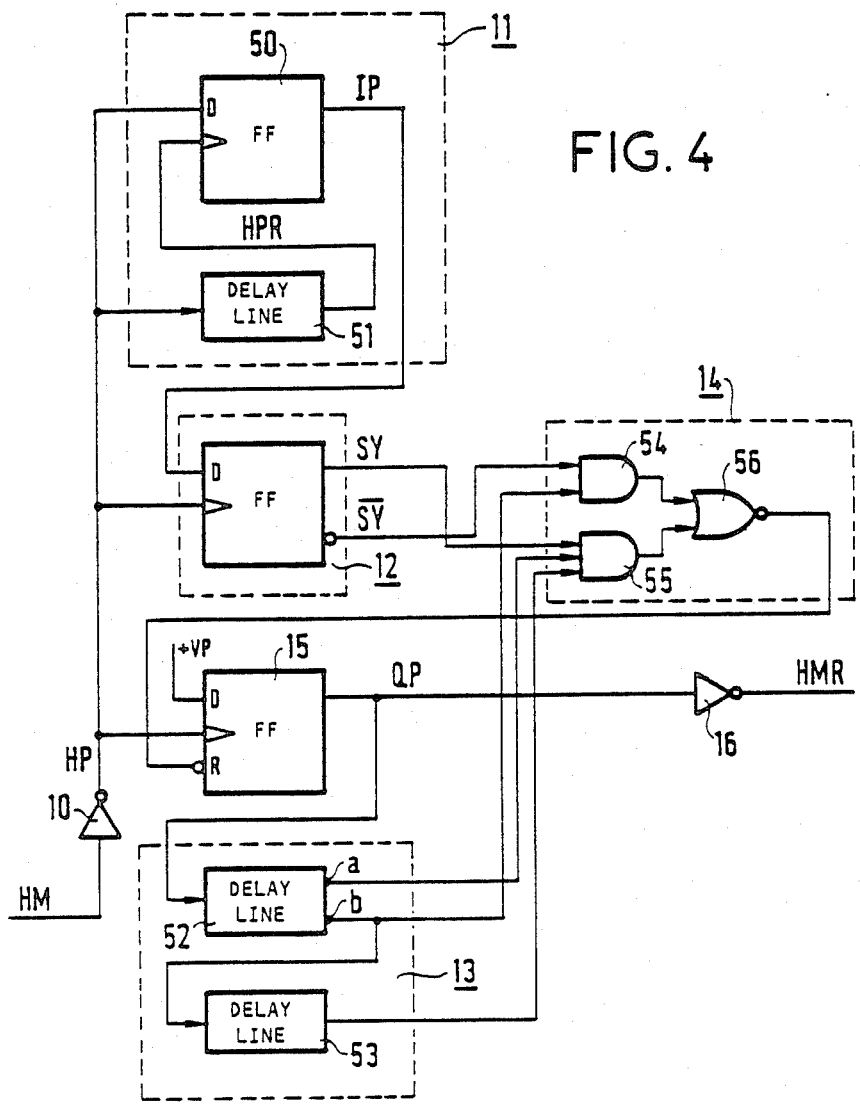
FIG. 4 shows a repeater of the transmission device of FIG. 1.

FIG. 4 shows the repeater 2 from FIG. 1. The test circuit 11 is identical to the test circuit 18 of the receiver; it therefore comprises a type D flip-flop 50 and a delay line 51; the data input of the flip-flop and the input of the delay line are connected to the output of the inverter 10 which delivers a signal HP which corresponds to the complemented signal HM.

The delay line delivers to the clock input of the flip-flop a signal HPR which is the signal HP delayed. The direct output of the flip-flop 50 delivers a pulse IP to the synchronization circuit 12 which comprises a type D flip-flop having a data input connected to the direct output of the flip-flop 50, a clock input connected to the output of the inverter 10, and a direct output and a complemented output connected to the selector circuit 14 to which these outputs deliver the synchronization pulses SY and $\overline{SY}$. The type D flip-flop 15 has a data input connected to a positive potential +VP, a clock input connected to the output of the inverter 10, a reset input connected to the output of the selector circuit 14 and a direct output delivering the signal QP and connected on the one hand to the inverter 16 and on the other hand to the delay circuit 13.

The delay circuit 13 is identical to the delay circuit 6 of the transmitter; it therefore comprises a first delay line 52 having a first output a and a second output b and a second delay line 53 having its input connected to the second output of the first delay line; the selector circuit 14 is identical to the selector circuit 7 of the transmitter and comprises a first AND gate 54, a second AND gate 55 and a NOR gate 56.

The first AND gate 54 has a first input connected to the complemented output of the flip-flop of the synchronization circuit 12 and a second input connected to the second output b of the first delay line 52; the second AND gate 55 has a first input connected to the direct output of the flip-flop of the synchronization circuit 12, a second input connected to the first output a of the first delay line 52 and a third input connected to the output of the second delay line 53; the NOR gate 56 has an input connected to the output of the first AND gate, another input connected to the output of the second AND gate and an output connected to the reset input of the flip-flop 15.

As in the delay circuit of the transmitter, the first delay line 52 introduces a time-delay of 10 ns on its first output a and a time-delay of 25 ns on its second output b; the second delay line introduces on its output a time-delay of 50 ns.

Figure 8:
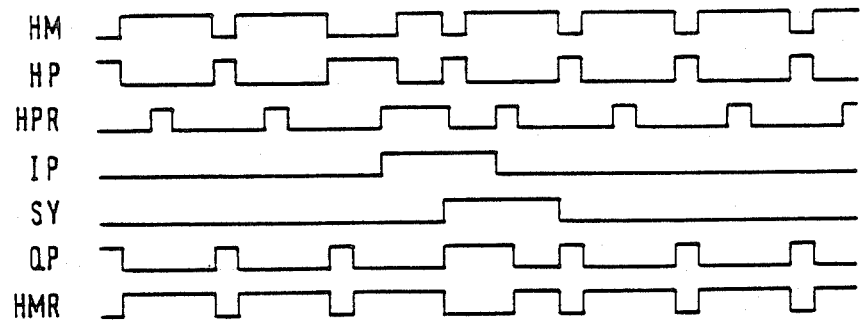

FIG. 8 is a timing diagram for the signals in the repeater which receives at its input the clock and synchronization signal HM from the transmitter or from another repeater when the transmitter-receiver link comprises a number of repeaters in series.

The test circuit 11 receives the signal HP from the inverter 10; when the flip-flop 50 receives clock pulses of the signal HP its direct output has the value 0; when the flip-flop 50 receives a synchronization pulse this is recognized and the direct output delivers a positive pulse IP of duration of 125 ns. In the synchronization circuit 12 the direct and complemented outputs of the flip-flop have the values 0 and 1, respectively, in the absence of any pulse IP at the input of the flip-flop and the values 1 and 0, respectively, when the positive pulse IP is applied to the input of the flip-flop.

The output of the flip-flop 15 delivers pulses in phase with the clock pulses of the signal HP; when a synchronization pulse appears in the signal HP, the output of the flip-flop 15 takes the value 1 and is reset to zero through the intermediary of the AND gate 55 of the selector circuit 75 ns later; thus AND gate 55 is active only for 10 ns, the signal delivered by the first output a of the first delay line 52 taking the value 0 again with a time-delay of 10 ns from the resetting to zero of the output of the flip-flop 15; given the propagation times of the flip-flop 15 and the selector circuit, the signal delivered by the selector circuit takes its initial value again at the end of a time interval equal to 85 ns+2 tp+2 t'p from the rising edge of the pulse HP delivered at the clock input of the flip-flop 15; as in the transmitter, this time interval is less than the duration of one period of the clock pulses in the signal HP, which is 125 ns in the example taken for the transmitter, so as to allow all the rising edges of the clock pulses to be recognized. The signal QP at the output of the flip-flop 15 is applied to the inverter 16 and there is obtained at the output a clock and synchronization signal HMR identical to the clock and synchronization signal HM applied to the input of the repeater which shifts the synchronization signal by one period of the clock signal (125 ns) relative to the input.

Figure 5:
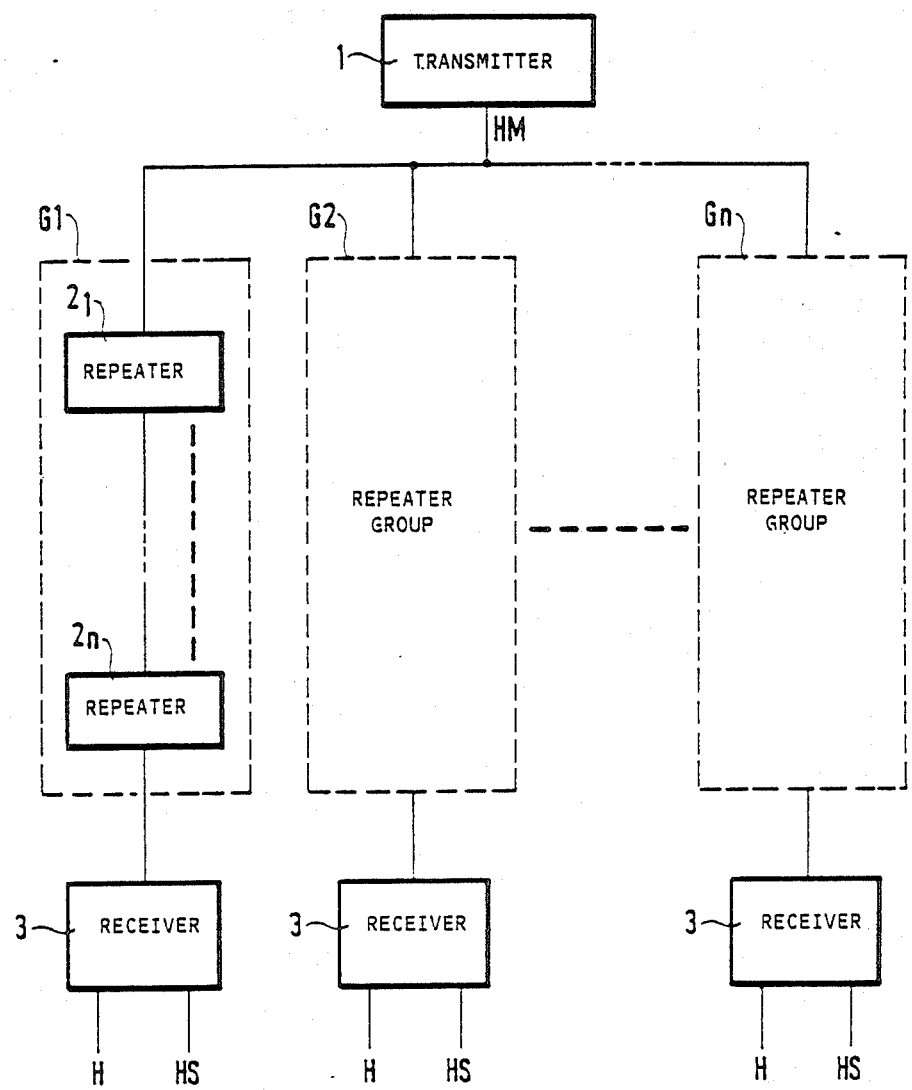
FIG. 5 shows a transmission device in accordance with the invention comprising groups of repeaters.

FIG. 5 shows the transmission of a clock and synchronization signal HM delivered by a transmitter 1 to receivers 3.

Each receiver is connected to the transmitter by a group of repeaters G1, G2, ... Gn; each group of repeaters comprises n repeaters $2_1, 2_2, \ldots 2_n$ in series. This distribution applies to the case where each receiver delivers clock signals H and synchronization signals HS to user circuits (not shown), these user circuits forming part of the same device. In this way the synchronization signals HS delivered by the receivers are all in phase, as they are shifted by n periods of the clock signal relative to the synchronization signal delivered by the transmitter in the clock and synchronization signal HM: likewise the clock signal H delivered by the receivers all feature a positive pulse at the time of the synchronization pulse which ensures that they are all in phase.

In the case of a transmitter having a low frequency and therefore relatively slow clock, the circuits of the transmitter and the receiver can accommodate relatively large timing margins and the repeater or repeaters may comprise a simple buffer. In the case of a high frequency clock (8 MHz, for example) it is necessary to utilize a repeater in accordance with the invention, however.

There is claimed:

1. Device for transmitting a clock signal accompanied by a synchronization signal, comprising a transmitter, a receiver adapted to deliver a clock signal and a synchronization signal to circuits connected to an output of said receiver, a link between said transmitter and said receiver and at least one repeater in said link, wherein said transmitter comprises a clock, a synchronization circuit, a flip-flop, a selector circuit, a delay circuit and an output inverter, said synchronization circuit has an input connected to said clock and first and second outputs connected to said selector circuit, said selector circuit has an input connected to a direct output of said flip-flop by said delay circuit and an output connected to a reset input of said flip-flop, and said flip-flop has a clock input connected to said clock, a data input adapted to be connected to a positive potential and a direct output connected to said output inverter which delivers a clock and synchronization signal to an output of said transmitter.

2. Device according to claim 1, wherein said synchronization circuit comprises a type D flip-flop and a counter having a count input connected to said clock, said flip-flop of said synchronization circuit has a data input connected to a ripple carry output of said counter and a direct output and a complemented output which are both connected to said selector circuit, said delay circuit comprises first and second delay lines connected in series, said first delay line has an input connected to a direct output of said flip-flop of said transmitter and first and second outputs connected to said selector circuit, said second delay line has an input connected to said second output of said first delay line and an output connected to said selector circuit, said selector circuit comprises first and second AND gates and a NOR gate having inputs connected to outputs of said first and second AND gates and an output connected to the reset input of said flip-flop of said transmitter, said first AND gate has a first input connected to said direct output of said flip-flop of said synchronization circuit and a second input connected to said second output of said first delay line, and said second AND gate has a first input conected to said complemented output of said flip-flop of said synchronization circuit, a second input connected to said first output of said first delay line, and a third input connected to the output of said second delay line.

3. Device according to claim 1, wherein each said repeater comprises an input inverter, a test circuit, a synchronization circuit, a flip-flop, a selector circuit, a delay circuit and an output inverter, said test circuit has an input connected to said input inverter and an output connected to said synchronization circuit, said synchronization circuit has an input connected to said input inverter and first and second outputs connected to said selector circuit, said selector circuit has an input connected to a direct output of said flip-flop of said repeater through said delay circuit of said repeater and an output connected to a reset input of said flip-flop of said repeater, and said flip-flop of said repeater has a clock input connected to said input inverter, a data input adapted to be connected to a positive potential and a direct output connected to said output inverter which delivers a clock and synchronization signal.

4. Device according to claim 3, wherein said test circuit comprises a type D flip-flop and a delay line having an output connected to a clock input of the flip-flop of said test circuit, an input of said delay line of said test circuit and a data input of said flip-flop are connected to the input inverter, said synchronization circuit comprises a type D flip-flop having a data input connected to a direct output of said flip-flop of said test circuit, a clock input connected to said input inverter and a direct output and a complemented output connected to said selector circuit, said delay circuit of said repeater comprises first and second delay lines connected to said selector circuit, said second delay line has an input connected to said second output of said first delay line and an output connected to said selector circuit, and said selector circuit comprises first and second AND gates having outputs connected to a NOR gate the output of which is connected to the reset input of said flip-flop of said repeater, said first AND gate has a first input connected to the complemented output of said flip-flop of said synchronization circuit and a second input connected to said second output of said first delay line, and said second AND gate has a first input connected to said direct output of said flip-flop of said synchronization circuit, a second input connected to said first output of said first delay line and a third input connected to the output of said second delay line.

5. Device according to claim 1, wherein a receiver comprises an input inverter, a test circuit, a restore circuit, a first output inverter, a detector circuit, a synchronization a divider circuit and a second output inverter, said test circuit has an input connected to said input inverter and an output connected to said restore circuit, said detector circuit has an input connected to said input inverter, a first output connected to said restore circuit and a second output connected to said synchronization and divider circuit, and said restore circuit has a first output connected to said first output inverter which delivers a synchronization signal and a second output connected to said synchronization and divider circuit which has an output connected to said second output inverter which delivers a clock signal.

6. Device according to claim 5, wherein said test circuit comprises a type D flip-flop and a delay line having an output connected to a clock input of said flip-flop of said test circuit, an input of said delay line and a data input of said flip-flop of said test circuit are connected to said input inverter, said detector circuit comprises a type D flip-flop and a delay line, a clock input of said flip-flop of said detector circuit is connected to said input inverter, said flip-flop of said detector circuit has a direct output connected to said restore circuit and a complemented output connected to said synchronization and divider circuit and to a reset input of said flip-flop of said detector circuit by said delay line, said restore circuit comprises a type JK flip-flop having first and second inputs respectively connected to the direct output and the complemented output of said flip-flop of said test circuit, a clock input connected to the direct output of said flip-flop of said detector circuit, a direct output connected to said first output inverter and a complemented output connected to said synchronization and divider circuit, and said synchronization and divider circuit comprises a type JK flip-flop having a first input connected to the complemented output of said restore circuit, a clock input connected to the complemented output of said flip-flop of said detector circuit, a second input adapted to be connected to a positive potential, and a direct output connected to said second output inverter.

* * * * *